US006965940B2

(12) United States Patent
Miyazawa et al.

(10) Patent No.: US 6,965,940 B2
(45) Date of Patent: Nov. 15, 2005

(54) OPERATING METHOD OF A STORAGE AREA NETWORK SYSTEM

(75) Inventors: Yoshihiko Miyazawa, Tokyo (JP); Masaharu Murakami, Tokyo (JP); Tsuyoshi Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 711 days.

(21) Appl. No.: 09/949,377

(22) Filed: Sep. 6, 2001

(65) Prior Publication Data

US 2002/0138642 A1 Sep. 26, 2002

(30) Foreign Application Priority Data

Mar. 26, 2001 (JP) ............................. 2001-087233

(51) Int. Cl.[7] ......................... G06F 15/16; H04L 12/26
(52) U.S. Cl. ....................... 709/229; 709/217; 709/232; 709/235; 370/229; 370/232; 370/233; 370/234
(58) Field of Search ................................. 709/232, 225, 709/203, 200, 202, 223–226, 229, 217–218; 370/229–234; 707/10, 204

(56) References Cited

U.S. PATENT DOCUMENTS

| 6,012,032 A | | 1/2000 | Donovan et al. | |
|---|---|---|---|---|
| 6,195,680 B1 | * | 2/2001 | Goldszmidt et al. | 709/203 |
| 6,314,565 B1 | * | 11/2001 | Kenner et al. | 717/171 |
| 6,353,926 B1 | * | 3/2002 | Parthesarathy et al. | 717/170 |
| 6,405,256 B1 | * | 6/2002 | Lin et al. | 709/231 |
| 6,504,818 B1 | * | 1/2003 | Levine | 370/229 |
| 6,532,543 B1 | * | 3/2003 | Smith et al. | 713/201 |
| 6,542,964 B1 | * | 4/2003 | Scharber | 711/122 |
| 6,553,568 B1 | * | 4/2003 | Fijolek et al. | 725/111 |
| 6,606,744 B1 | * | 8/2003 | Mikurak | 717/174 |
| 6,657,954 B1 | * | 12/2003 | Bird et al. | 370/229 |
| 6,657,955 B1 | * | 12/2003 | Bonneau et al. | 370/229 |
| 6,701,316 B1 | * | 3/2004 | Li et al. | 707/10 |
| 6,708,213 B1 | * | 3/2004 | Bommaiah et al. | 709/226 |
| 6,738,348 B1 | * | 5/2004 | Rollins | 370/230 |
| 6,868,062 B1 | * | 3/2005 | Yadav et al. | 370/234 |

FOREIGN PATENT DOCUMENTS

JP             07-334440         12/1995

* cited by examiner

Primary Examiner—Saleh Najjar
Assistant Examiner—Asad M. Nawaz
(74) Attorney, Agent, or Firm—Townsend and Townsend and Crew LLP (57) ABSTRACT

An operating method of a storage area network system which conducts transmittance of data by a plurality of servers accessing a storage through a storage area network, the storage area network system operating: obtaining and monitoring a data transfer amount between the respective servers and the storage; comparing a prescribed data transfer amount prescribed by the server and the obtained actual data transfer amount; selecting one of a plurality of ports provided in the storage according to the comparison result; and providing the relevant server an instruction to connect to the selected port.

4 Claims, 6 Drawing Sheets

| | A: ACTUAL TRANSFER AMOUNT (MB) PER UNIT TIME (T1) | B: PRESCRIBED TRANSFER AMOUNT (MB) | A-B |
|---|---|---|---|
| USER SERVER 1 | 65*T1 | 1000 | +20 |
| USER SERVER 2 | 30*T1 | 1500 | -20 |
| USER SERVER 3 | 30*T1 | 2000 | -40 |

FIG.5

| | PRIORITY ORDER1 PATH | PRIORITY ORDER2 PATH | PRIORITY ORDER3 PATH |
|---|---|---|---|
| USER SERVER 1 | c0 | c1 | c2 |
| USER SERVER 2 | c1 | c2 | c0 |
| USER SERVER 3 | c2 | c0 | c1 |

FIG.6

(EXAMPLE OF USER SERVER 1)

OPERATING METHOD OF A STORAGE AREA NETWORK SYSTEM

The present application claims priority upon Japanese Patent Application No. 2001-87233 filed on Mar. 26, 2001, which is herein incorporated by reference.

BACKGROUND OF THE INVENTION

1. Field of the Invention

The present invention relates to an operating method of a storage area network system.

2. Description of the Related Art

Recently, due to the complexity of system management and with the aim of reducing system operation management cost, there is rapid growth in services such as an Internet Data Center (hereinafter referred to as "IDC") or a Storage Service Provider (hereinafter referred to as "SSP"). These services provide management of servers consigned by a corporation and central management of data thereof.

With the IDC and SSP, in particular, a Storage Area Network (hereinafter referred to as "SAN") which uses a fiber channel capable of high-speed and long distance data transfer is connected with a plurality of servers and storages to construct the SAN system, thus storage management is integrated. This storage is constructed of a large scale disk array equipped with multiple large-capacity magnetic disks, and centrally manages large amounts of various data that are consigned. An end user, from his/her own information terminal (hereinafter referred to as "user terminal"), via such as a Wide-area Network (hereinafter referred to as "WAN") and a Local Area Network (hereinafter referred to as "LAN"), accesses a user server inside the IDC and SSP. The user server responds to a request from the user terminal, and conducts transmittance of data by connecting to the storage via the SAN.

In such a SAN system, it is necessary to control the data transfer amount to be transmitted, in order to respond to data transfer requests which concentrate from the respective server. Conventionally, when the user terminal accesses the storage through the user server, a method of controlling the transmittable data transfer amount is used, and a connecting speed (line speed) for data transfer is limited by using such as a switching hub on the network which is connected to the server. In this case, an expensive switching hub must be introduced to the entrance of the network connecting to the WAN, and the cost becomes extremely high.

Then, the present applicant proposed a method/system of limiting the speed of data transfer between the server and the storage, without using an expensive switching hub. In other words, the ports of the plurality of fiber channels installed to the storage side are made to differ in data transfer speed from each other. These port groups deal with the various data transfer requested by the respective server. As a specific operation, in a contract with a service user, a prescribed data transfer amount is determined for respective servers, and the respective server selects a storage port appropriate for its own data transfer amount, and then performs data transfer.

However, there is a case where the server makes a request exceeding the prescribed data transfer amount determined in the contract. When such an unplanned request of data transfer exceeding predicted values is accepted, there occurs an obstruction in other data transfer, and the entire SAN system deteriorates in response performance in respect to requests from the respective servers.

As an example, when there is a data transfer request from a certain server, if it is in accordance with the contract, usually only a port with a line speed of 60 MB/S or less needs to be used. In the case a request for data transfer amount exceeding the provision occurs, since a conventional storage does not have a port which can control the transfer speed, the maximum transfer speed prepared on the storage side is to be used. Then, when a different server requests for a large-capacity data transfer, the port with the maximum speed which was originally usable can not be selected and used. Thus, a hindrance such as a delay in data transfer occurs, and a response performance of the entire SAN system deteriorates.

SUMMARY OF THE INVENTION

The present invention is made to solve the above object, and the object is to prevent response performance of an entire SAN system from deteriorating, and to markedly improve the efficiency of the entire data transfer between a storage and a plurality of servers through the SAN.

In order to achieve the above object, in an operating method of a storage area network system according to one aspect of the present invention, which conducts transmittance of data by a plurality of servers accessing a storage through the storage area network, wherein the storage area network system operating method obtains and monitors a data transfer amount between the respective servers and the storage; compares the data transfer amount prescribed by the server and the obtained actual data transfer amount; selects any of a plurality of ports provided in the storage according to the comparison result; and provides the relevant server an instruction to connect to the port.

BRIEF DESCRIPTION OF THE DRAWINGS

The manner in which the foregoing and other objects of this invention are accomplished will be apparent from the accompanying specification and claims considered together with the drawings, wherein:

DESCRIPTION OF THE PREFERRED EMBODIMENTS

==A Structural Example of a SAN System==

Figure 1:
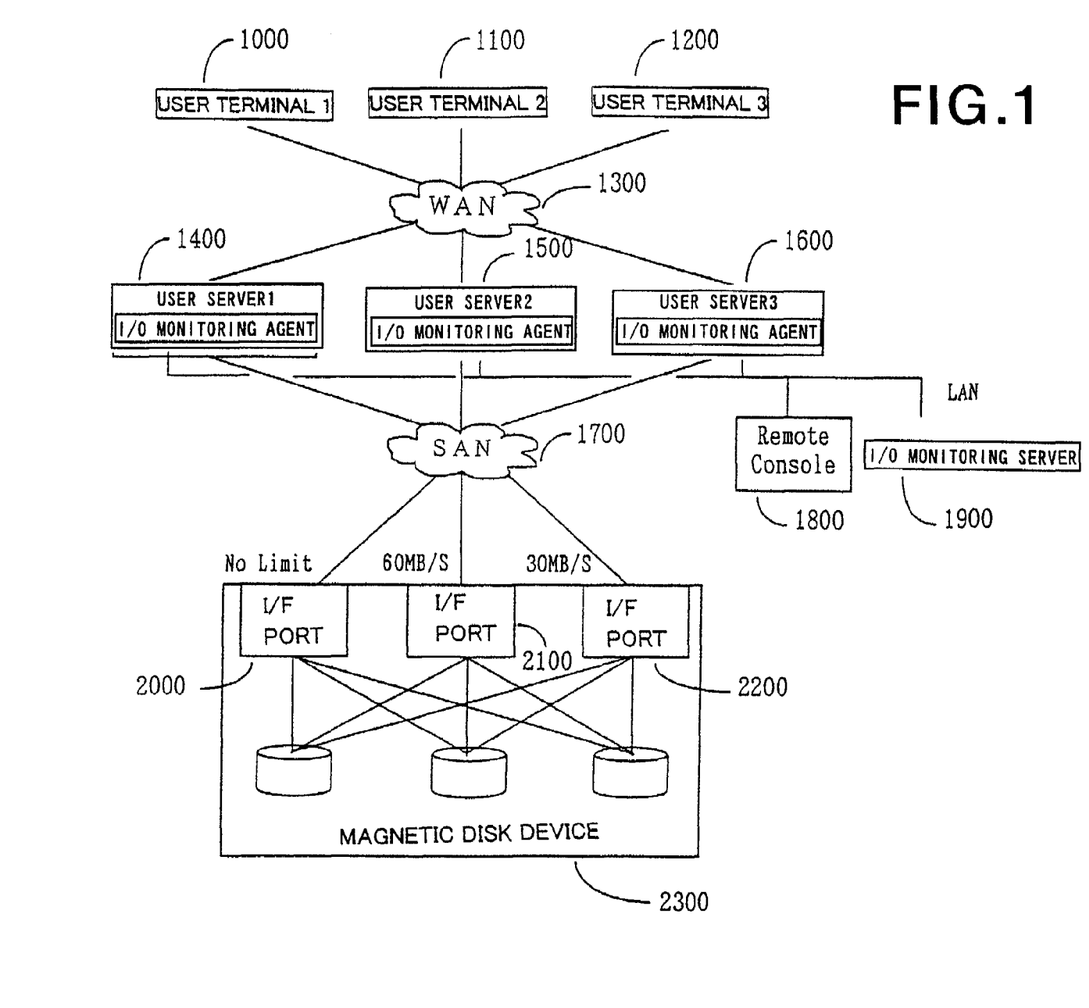
FIG. 1 is a structural diagram showing an embodiment of a SAN system according to the present invention.

FIG. 1 shows a structural example of a SAN system of the present invention applied to a SSP or an IDC. As shown in FIG. 1, in the SAN system, a plurality of user servers 1400, 1500 and 1600, and a magnetic disk device (storage) 2300 are connected through a SAN 1700.

The magnetic disk device 2300 comprises a large scale disk array equipped with multiple large-capacity magnetic disks (hard disks), and equipped with I/F ports 2000, 2100, 2200, respectively having different data transferring speeds (line speed). The I/F port 2000 provides a maximum data transfer speed (No Limit) of 100 MB/S or the like. The data transfer speed of the I/F port 2100 is a medium speed of 60 MB/S, and the data transfer speed of the I/F port 2200 is a low speed of 30 MB/S. The respective I/F ports 2000, 2100 and 2200 are basically connected to all the magnetic disks. Therefore, the respective user servers 1400, 1500 and 1600 may use any of the respective I/F ports 2000, 2100, and 2200. Thus, the magnetic disk device 2300 has a function of setting a plurality of paths for accessing a particular disk. In this way, it becomes possible for the respective user servers 1400, 1500 and 1600 to conduct data transfer by selecting a port with an appropriate transfer speed, in respect to a particular disk which one has to access. Through the respective I/F ports, data transfer between the respective user servers 1400, 1500 and 1600 and the magnetic disk device 2300 is conducted.

Further, the respective user servers 1400, 1500 and 1600 are equipped with an I/O monitoring agent. This agent conducts recording of a log of the data transfer conducted between the user servers 1400, 1500, and 1600 and the magnetic disk device 2300, as well as totaling the transfer rate and the like of input and output of data (hereinafter referred to simply as "I/O") for every physical disk inside the magnetic disk device 2300 which has actually conducted recording and reading. The respective user servers 1400, 1500 and 1600 are connected with an I/O monitoring server 1900 (data transfer amount monitoring means) via a LAN. This I/O monitoring server 1900 conducts monitoring of I/O access request and data transfer amount of the respective user servers 1400, 1500 and 1600. Specifically, this I/O monitoring server 1900 obtains the total record regarding each data transfer from the I/O monitoring agent of the respective user servers and conducts monitoring. Based on this monitoring result, the I/O monitoring server 1900 appropriately selects the port of the magnetic disk device 2300 which is connected to the respective user servers 1400, 1500 and 1600, so that the entire SAN system does not deteriorate in response performance in respect to the data transfer request from the respective user servers 1400, 1500 and 1600. Accordingly, the path to a particular disk which should be accessed by the respective user servers 1400, 1500 and 1600 is altered, and transmittance of data through the I/F port with an appropriate transfer speed may be conducted.

Note that, the respective user servers 1400, 1500 and 1600 are connected with a remote console 1800 via the LAN, and with this remote console 1800, initial setting, setting change or the like for each portion of the device which construct the SAN system is possible.

User terminals (clients) 1000, 1100 and 1200 access the SAN system via the WAN or the LAN, and receive various services using the data of the magnetic disk device through the user servers 1400, 1500 and 1600 to be used.

==Operating Method of the SAN System==

An embodiment of an operating method of the SAN system according to the present invention is described. First, in summary, the respective users who consign data management by entrusting the user server, conclude in advance a Billing Contract regarding data transfer with the magnetic disk device 2300. The content of the Billing Contract may be, according to the mode of use, such where the data amount which may be transferred during a certain amount of time is determined in advance, and billing may be performed in accordance with the data amount transferred during the certain time; or may be such where the fee is fixed regardless of the data amount transferred. When there is an access request exceeding the data transfer amount which exceeds the contract conditions, in accordance with the respective contract conditions, data transfer speed is automatically reduced, or is always fixed to a lower data transfer speed, thereby preventing deterioration of data transfer efficiency, that is access performance, of the entire SAN system.

==Data Transfer Amount Monitoring Method==

Figure 2:
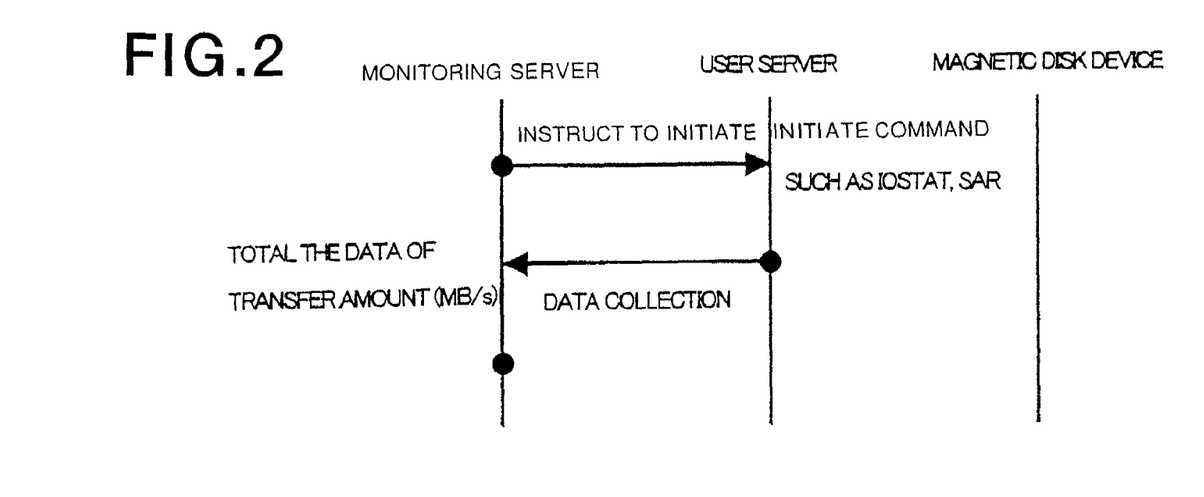
FIG. 2 is a job flow diagram of when a monitoring server obtains a data transfer amount from a user server in an embodiment of the present invention.
Figure 3:
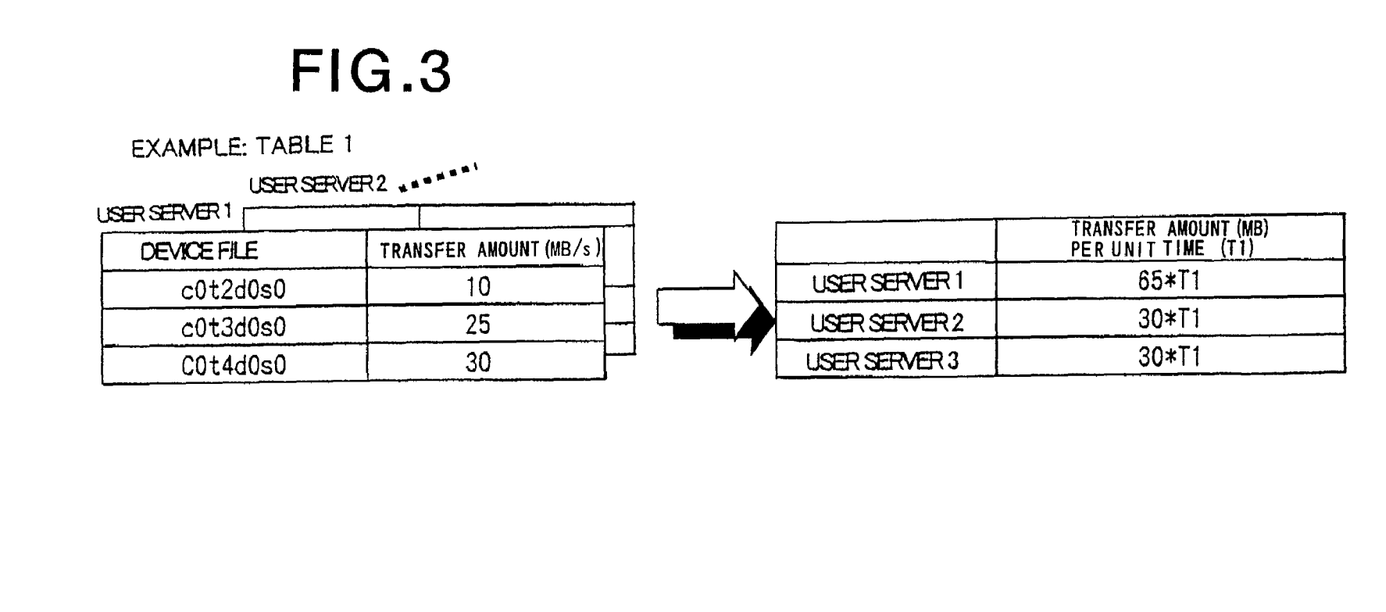
FIG. 3 is a table showing the monitoring server totaling the data transfer amount of the respective user servers in an embodiment of the present invention.
Figure 4:
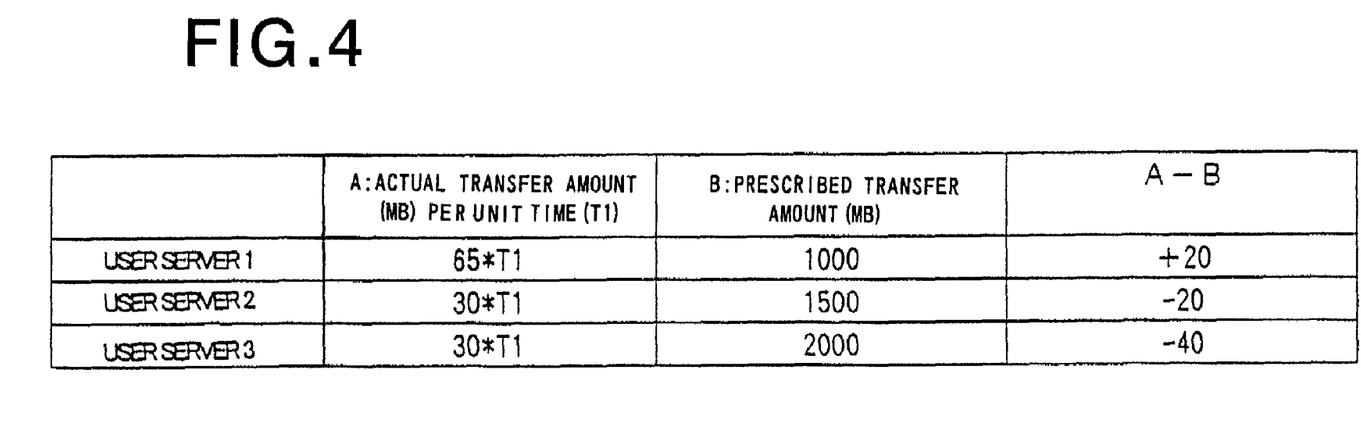
FIG. 4 is a table comparing an actual data transfer amount per unit time and a prescribed data transfer amount in an embodiment of the present invention.

First, as shown in FIG. 2, the I/O monitoring server 1900 instructs the user servers 1400, 1500 and 1600 to initiate a command (for example, iostat, sar or the like) to self-monitor the data transfer amount between the magnetic disk device 2300. Next, the I/O monitoring server 1900 collects from the respective user servers 1400, 1500 and 1600 the data transfer amount within a predetermined time as a self monitoring result. This collected data transfer amount, as shown in table 1 of FIG. 3, is corresponded to every disk of the magnetic disk device 2300. Then, the I/O monitoring server 1900 totals the data transfer amount of the user servers 1400, 1500 and 1600 using the device file names of each disk as the key. Then, as shown in the table of FIG. 4, a comparison of the actual data transfer amount per unit time obtained as a result of totaling, and the agreed prescribed data transfer amount is performed for the respective user servers 1400, 1500 and 1600.

Figure 5:
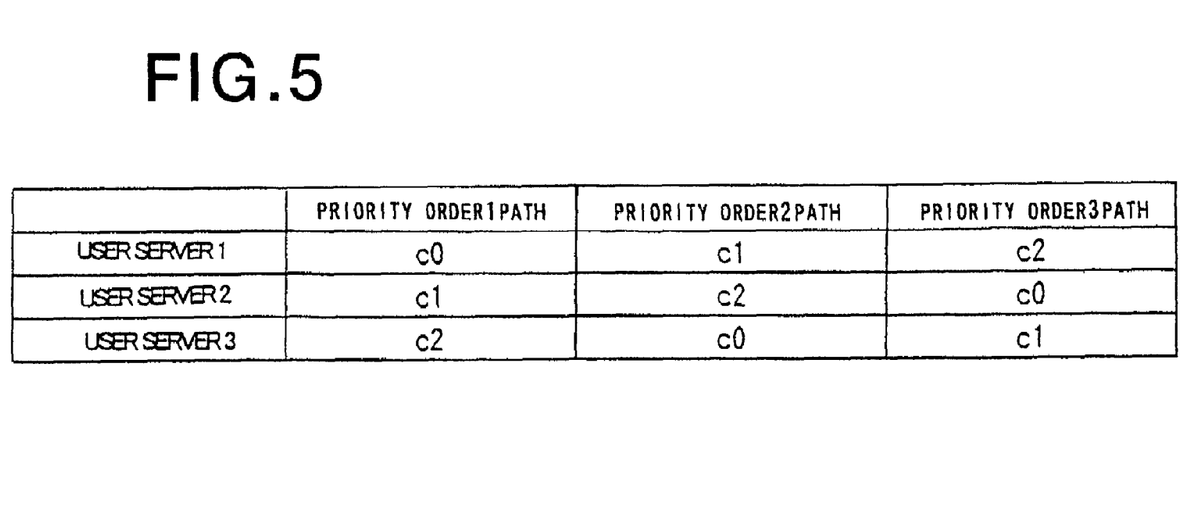
FIG. 5 is a table showing the priority order of switching of the path of each user server in an embodiment of the present invention.
Figure 6:
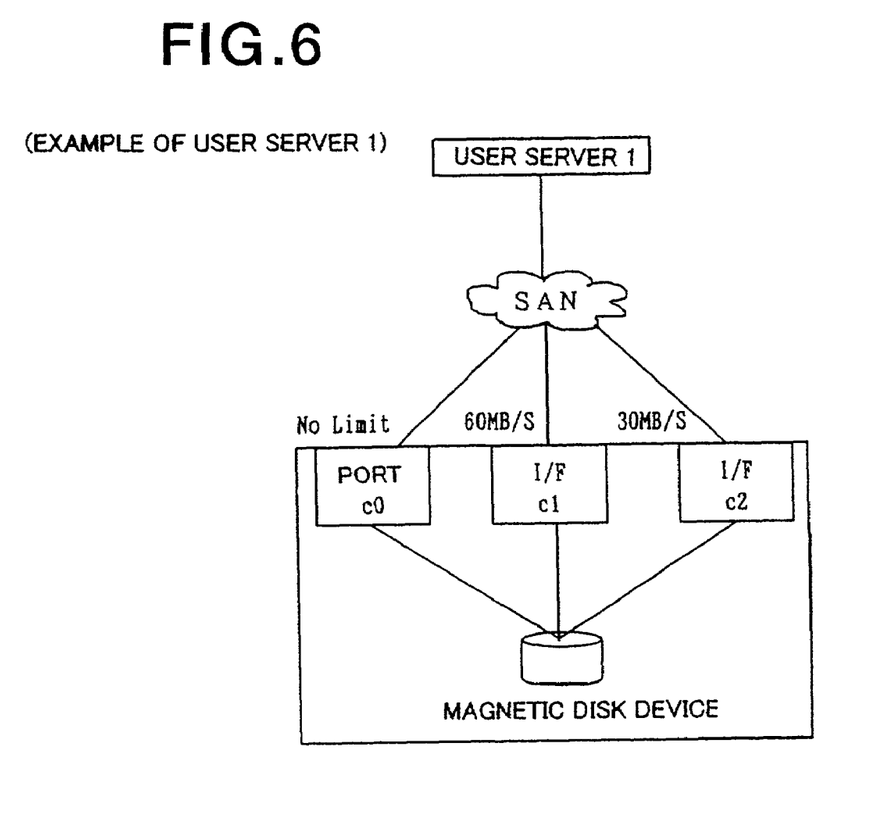
FIG. 6 is a diagram showing the priority order of path switching to a particular disk that a user server 1 accesses in an embodiment of the present invention.

As a result of this comparison, when the actual data transfer amount exceeds the prescribed data transfer amount, according to the user server's type of contract, the port of the magnetic disk device 2300 used at the time of data transfer may be changed by switching a path. This switching rule of paths for port change is defined by the I/O monitoring server 1900 in advance, and for example as shown in the table of FIG. 5, paths corresponding to the priority in three levels is determined. For example, as shown in the block diagram of FIG. 6, regarding the user server 1, as a highest priority path c0, a port with a limitless highest data transfer speed (No Limit) is assigned, and as the next highest priority path c1, a port with a medium speed data transfer speed (60 MB/S) is assigned. Then, as the third priority path c2, a port with a medium speed data transfer speed (30 MB/S) is assigned.

<<Embodiment>>

In this embodiment, as an example of data transfer two kinds of cases are assumed. The first case is when the access frequency from the user server is relatively low, and also the data transfer amount for one access is relatively large. The second case is when the access frequency from the user server is higher than the predetermined frequency, and also the data transfer amount for one access is relatively smaller than the predetermined transfer amount.

Figure 7:
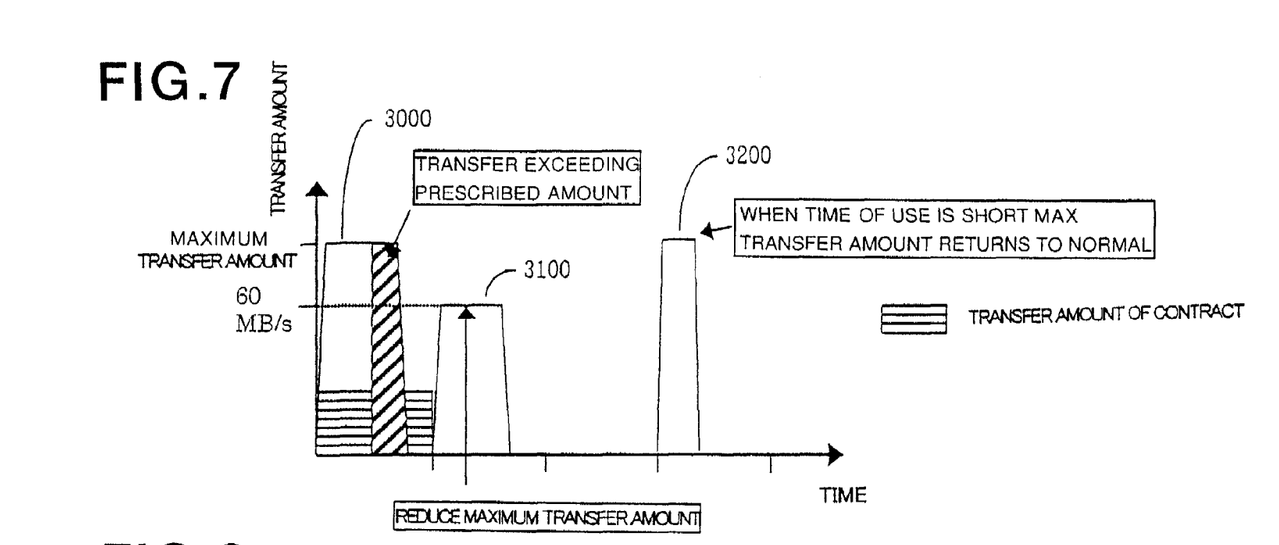
FIG. 7 is a graph showing an example of a form of use when the data transfer amount transmitted in a certain time is large in an embodiment of the present invention.

The first case is described with reference to FIG. 7. As a contract condition of the first case, the maximum performance which may be realized by the system is made usable by the user. That is, the I/F port 2000 of maximum data transfer speed is made usable. Further, the data amount that may be transferred during a certain length of time is determined in advance, and billing is conducted according to the data amount which can be transferred during this certain length of time. Under such contract condition, the I/O monitoring server 1900 in FIG. 1 monitors the data transfer amount from the respective user servers 1400, 1500 and 1600, and compares to determine whether or not it exceeds the prescribed data transfer amount determined in the contract. As a result of this comparison, in a case there is data transfer exceeding the prescribed data transfer amount as shown by the number "3000" in FIG. 7, at the time of the next access (data transfer) request, as shown by number "3100" in FIG. 7, the I/O monitoring server 1900 switches the I/F port used by the relevant user servers 1400, 1500 and 1600 to that with a medium speed (60 MB/S) (2100 in FIG. 1), and restricts the upper limit of the data transfer speed. Note that the amount exceeding the prescribed data transfer amount is combined with the data transfer amount at the time of the next access and summed up. Further, if after switching to the mediums speed I/F port and restricting the upper limit of the data transfer speed, the data transfer time becomes short and the data transfer amount settles within the limit of the contract, as shown by number "3200" in FIG. 7, the above-mentioned restricting measure of the data transfer speed is cancelled, and it becomes possible to use the port with the maximum transfer speed as before.

Figure 8:
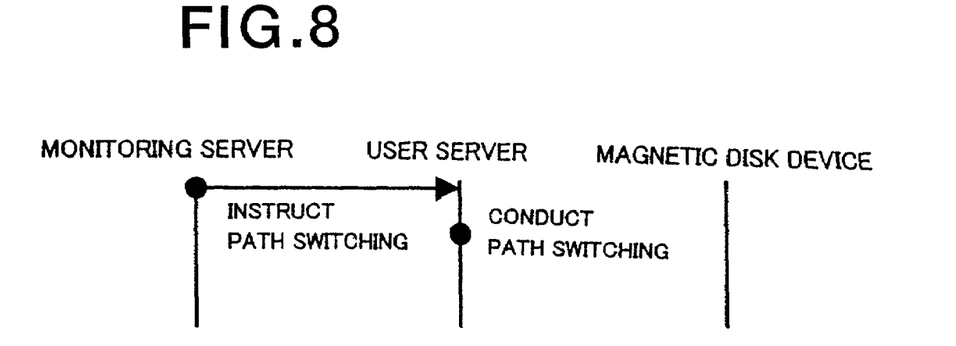
FIG. 8 is a job flow chart showing the user server which has received a path switching instruction from the monitoring server, conducting switching of the path in an embodiment of the present invention.

The switching of this I/F port, as shown in a path switching flow in FIG. 8, is conducted by giving an instruction from the I/O monitoring server 1900 to the respective user servers 1400, 1500 and 1600 to switch I/F ports. The instruction to switch the I/F port uses a shift path function equipped in the respective user servers 1400, 1500 and 1600. If this shift path function of the user servers 1400, 1500 and 1600 is used, the switching of the I/F ports almost instantaneously may be possible, without stopping the data transmittance of the user servers.

As described above, when the prescribed data transfer amount determined in the contract is exceeded, at the time of data transfer with the next access, data transfer amount between the relevant user server and the magnetic disk device 2300 is suppressed. That is, the data transfer speed between the magnetic disk device 2300 and the user servers 1400, 1500 and 1600 in FIG. 1 deteriorates. By this, the I/F port 2000 with the maximum data transfer speed becomes free, data transfer requests from other user servers may be answered, a situation where the response of the entire SAN system deteriorates is avoided, and a good response performance can be maintained. On the other hand, the data transfer speed requested by the user servers 1400, 1500 and 1600 becomes restricted, but in the first case, the data transfer amount in one access is relatively large, but the access frequency from the user servers 1400, 1500 and 1600 is relatively low. Therefore, even if the data transfer speed is restricted, the data transfer amount may be extended in the time axis direction, and the actual data transfer amount can settle within the scope of the prescribed data transfer amount determined in the contract.

Figure 9:
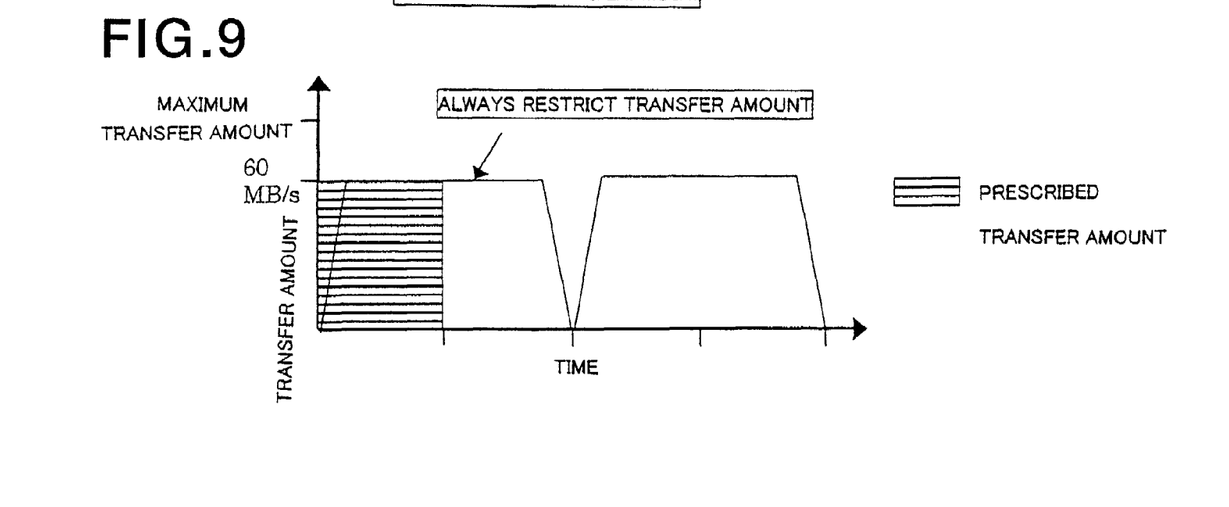
FIG. 9 is a graph showing an example of a form of use when the data transfer amount transmitted in a certain time is constant in an embodiment of the present invention.

Next, the second case is described with reference to FIG. 9. The I/O monitoring server 1900 provides an instruction to a relevant server to connect to an I/F port which does not have the maximum data transfer speed. That is, the I/O monitoring server 1900 instructs not the I/F port 2000 with the maximum data transfer speed, but the 60 MB/S I/F port 2100 and the 30 MB/S I/F port 2200 as the connection. Note that, FIG. 9 shows an example of always using the 60 MB/S I/F port (2100 in FIG. 1).

Therefore, the data transfer amount between the relevant user server and the magnetic disk device 2300 is suppressed. That is, the data transfer speed between the magnetic disk device 2300 and the user server in FIG. 1 is restricted, and as a result, access of the user terminal to the user server always becomes restricted, but the actual data transfer amount can be settled within the prescribed data transfer amount determined in the contract. In this way, the I/F port with the maximum data transfer speed is released, data transfer requests from other user servers may be answered, the situation that the response of the entire SAN system deteriorates is avoided, and a satisfactory response performance may be maintained. On the other hand, the data transfer speed requested by the user servers 1400, 1500 and 1600 will be restricted, but in the second case, the access frequency from the user servers 1400, 1500 and 1600 is relatively high, though data transfer amount at in one access is relatively small. Therefore, even if the data transfer speed is restricted, the data transfer amount may be extended in the time axis direction, and the actual data transfer amount may be settled within the prescribed data transfer amount determined in the contract.

Figure 10:
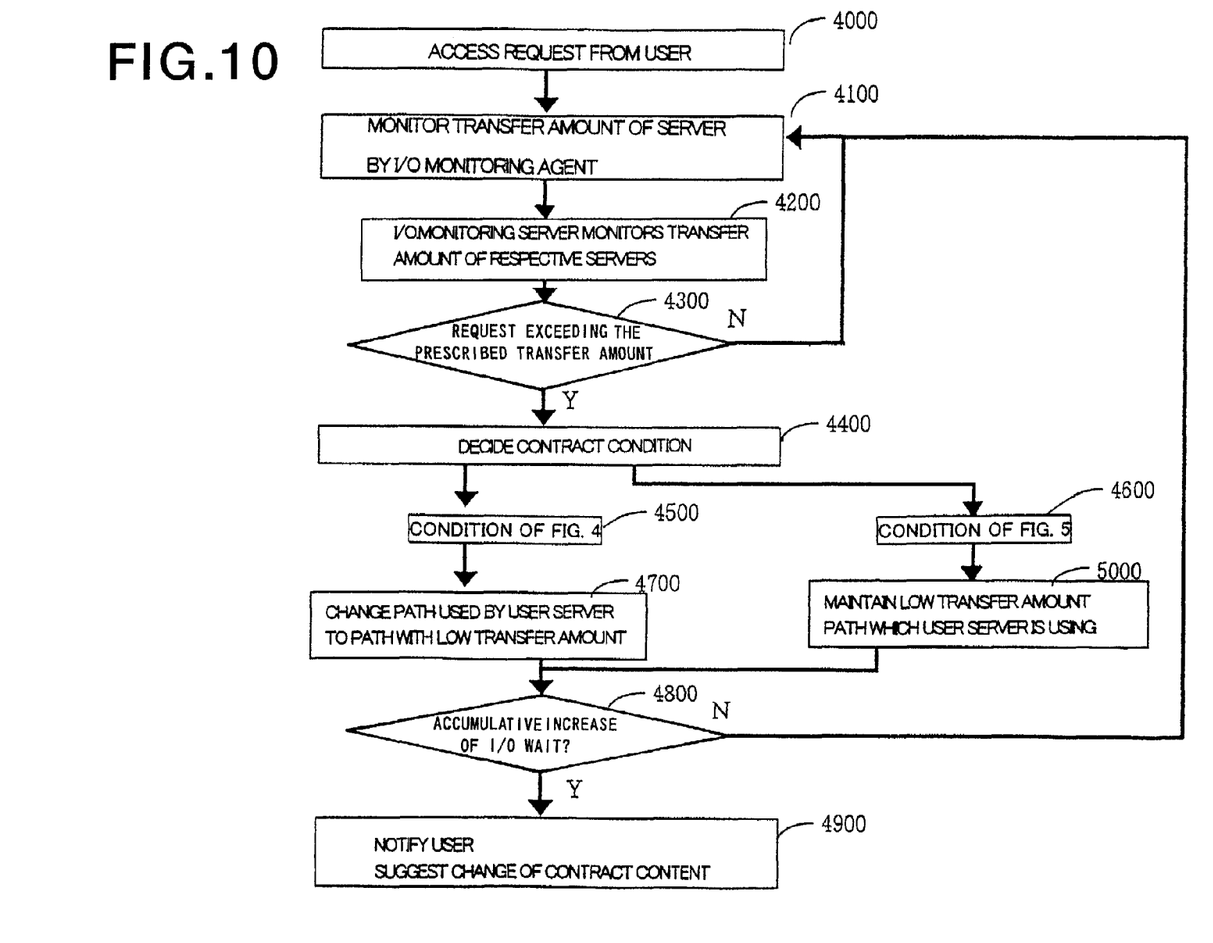
FIG. 10 shows a flow chart showing an example of an operating method of the SAN system in an embodiment of the present invention.

The job flow of the I/O access monitor control including the described first and second cases, will be described referring to the flow chart shown in FIG. 10. First, when there is an access request from a user terminal (4100), the I/O monitoring agent conducts monitoring of the data transfer amount between the user server that it is stationed in and the magnetic disk device 2300 (4200). Next, the I/O monitoring server 1900 collects data from the operating I/O monitoring agent in the respective user servers (1400, 1500 and 1600 in FIG. 1) to conduct monitoring (4200). Specifically, the I/O monitoring agent in the respective user servers 1400, 1500 and 1600, as described above, totals the I/O data transfer rate for every physical disk, and this totaled data is collected to the I/O monitoring server 1900 via the LAN. The I/O monitoring server 1900 totals the collected data transfer rate of the respective user servers 1400, 1500 and 1600 for each port of the fiber channels of the magnetic disk device 2300. The I/O monitoring server, based on this totaled result, compares the actual data transfer amount of the respective user servers 1400, 1500 and 1600, and the prescribed data transfer amount of the contract, and judges whether it exceeds the prescribed data transfer amount (4300). If the I/O transfer amount of the respective server exceeds the prescribed data transfer amount, the process is distributed in accordance with the contract condition (4400).

For example, when the contract conditions are as in the first case as shown in FIG. 4, the path that the user server uses is changed to a low transfer speed path (4700). In the method of changing the I/F port of the magnetic disk device of the user servers 1400, 1500 and 1600, as described above, the I/O monitoring server 1900 instructs the relevant user server 1400, 1500, 1600 to switch the port via the LAN. Then, the respective user servers 1400, 1500, 1600 with its own shift path function, almost instantaneously change the path even when the terminal used by the end user is during I/O access. Nevertheless, according to step (7) of FIG. 10, if the I/O wait of the I/O monitoring agent accumulatively increases (4800:YES), the decrease in response regarding data transfer to the relevant user terminal is notified via the user server, and the change of the billing system to be in the contract is suggested (4900). If there is no accumulative increase of I/O wait (4800:NO), the process returns to the above described 4100.

On the other hand, in the process (4400) where processes are distributed in accordance with contract conditions, when in the second case where the contract condition is as shown in FIG. 5 (4600), as described above, the I/O monitoring server provides the relevant server with an instruction to connect to the I/F port which does not have the maximum data transfer speed (5000). That is, it instructs as the connection, not the I/F port 2000 with the maximum transfer speed, but the 60 MB/S I/F port 2100 or the 30 MB/S I/F port 2200. Further, regardless of that, if the I/O wait seems to accumulatively increase (4800:YES), a change of the billing system of the contract is suggested (4900). If there is no accumulative increase of I/O wait (4800:NO), the process returns to the above described 4100.

The above described example, is simply an embodiment of the present invention, and modifications or change are possible without departing from the spirit and scope of the present invention. For example, the function of the I/O monitoring server 1900 in FIG. 1 may be provided in the magnetic disk device 2300.

According to aspects of the present invention, the introduction cost may be reduced for omitting such as an expensive switching hub. Further, by reducing the frequency of use of unnecessary ports having a high transfer speed as much as possible, the high speed port does not need not be occupied unnecessarily. Therefore, a server which accesses at a high frequency and requests for a large data transfer is made capable of use of a high speed port which is originally needed. Accordingly, it is possible to markedly improve the efficiency of the entire data transfer between the storage and the plurality of servers through the storage area network. Therefore, it becomes possible to assure access performance of the user terminals in respect to the SAN system which is used as the SSP and IDC.

Although the preferred embodiment of the present invention has been described in detail, it should be understood that various changes and substitutions can be made therein without departing from spirit and scope of the inventions as defined by the appended claims.

What is claimed is:

1. A method of operating a storage area network system in which data is transferred among a plurality of servers and a storage area network having storage for storing the data, the method comprising:
    providing the storage with a plurality of ports having different data transferring speeds;
    monitoring an amount of data transferred between a server and the storage;
    comparing a predetermined data transfer amount set in each server and the monitored amount of data transferred;
    selecting one of the plurality of ports based upon the step of comparing; and
    providing the server with an instruction to connect to the selected port.

2. A method as in claim 1 wherein depending upon the monitored amount of data transferred between a server and the storage as compared to the predetermined data transfer amount, an instruction is given to switch to a port with a lower data transfer speed.

3. A method as in claim 2 wherein depending upon the monitored amount of data transferred a port is selected with a lower access frequency to the storage than a predetermined access frequency.

4. A method as in claim 1 wherein when the amount of data transferred between a server and the storage does not exceed the predetermined data transfer amount, and the monitored data transfer amount is at a higher access frequency to the storage than a predetermined access frequency, an instruction is provided to switch accesses by that server to a port other than a port with a maximum data transfer speed.

* * * * *